United States Patent [19]

Hahn

[11] Patent Number: 5,013,884
[45] Date of Patent: May 7, 1991

[54] WATER TABLE FOR A THERMAL-CUTTING MACHINE, ESPECIALLY FOR PROCESSING ALUMINUM, WITH AN UNDERWATER PLASMA-BASED CUTTING SYSTEM

[75] Inventor: Hans J. Hahn, Emstal, Fed. Rep. of Germany

[73] Assignee: Wegman & Co. GmbH, Kassel, Fed. Rep. of Germany

[21] Appl. No.: 596,178

[22] Filed: Oct. 11, 1990

[30] Foreign Application Priority Data

Oct. 19, 1989 [DE] Fed. Rep. of Germany ....... 3934822

[51] Int. Cl.⁵ .............................................. B23K 9/00
[52] U.S. Cl. ......................... 219/121.48; 219/121.39; 219/121.58; 219/121.51; 266/49; 266/65
[58] Field of Search ..................... 219/121.48, 121.51, 219/121.36, 75, 121.54, 121.39, 121.58; 266/49, 65

[56] References Cited

U.S. PATENT DOCUMENTS 3,743,260  7/1973  Alleman et al. ................... 266/49
4,453,702  6/1984  Anderson et al. ................. 266/49
4,776,571 10/1988  Loogee ............................. 266/49

Primary Examiner—M. H. Paschall
Attorney, Agent, or Firm—Sprung Horn Kramer & Woods

[57] ABSTRACT

A water table for a thermal-cutting machine, especially for processing aluminum, with an underwater plasma-based cutting system, with a surface that is immersed in a tank of water and that supports the material, and with a device for raising and lowering the level of the water. The inner surfaces of the side walls of the water tank slope in below the surface that supports the material. A forwarding gutter extends along the bottom of the tank and accommodates an apron-type conveyor. The upper strand of the conveyor extends through the front wall of the tank and up through a water-tight duct to a container that accommodates the coarser particles. A sludge trough is positioned below the gutter at the end that the bottom strand of the conveyor travels toward. A device for raising and lowering the level of the water includes an inflatable cushion located in the tank and under the water.

12 Claims, 7 Drawing Sheets

WATER TABLE FOR A THERMAL-CUTTING MACHINE, ESPECIALLY FOR PROCESSING ALUMINUM, WITH AN UNDERWATER PLASMA-BASED CUTTING SYSTEM

BACKGROUND OF INVENTION

The invention concerns a water table for a thermal-cutting machine, especially for processing aluminum, with an underwater plasma-based cutting system, with a surface that is immersed in a tank of water and that supports the material, and with a device for raising and lowering the level of the water.

Designing a water table of this type entails a number of problems, especially in relation to raising and lowering the level of the water and removing residue from the cutting process.

It has for example been discovered that a lot of gaseous hydrogen occurs, especially when aluminum is being cut with a plasma torch, leading to from slight to serious explosions. This situation is due to the molten aluminum becoming atomized under the water and expelled from the incision by the kinetic energy of the plasma jet. The particles of metal are lifted by steam tension and precipitate in the capacity of cutting residue through the water, with known chemical conditions leading to a reaction that results in aluminum oxide and hydrogen.

The level of the water is raised and lowered in known water tables by means of air traps in the form of cuffed bells or compartments, within which explosive mixtures can accumulate, however, due to the aforesaid formation of hydrogen when aluminum is cut with an underwater plasma torch because particles of the metal can enter when the chambers are flooded.

SUMMARY OF THE INVENTION

The object of the present invention is to improve a water table for a thermal-cutting machine that is especially appropriate for the plasma-based cutting of aluminum to the extent that gaseous hydrogen and gaseous mixtures that contain hydrogen will not occur. The point of departure for the invention is first to remove the residual metal from the water tank of such a water table as rapidly and completely as possible and second to prevent gaseous mixtures that include hydrogen from accumulating in the device for raising and lowering the level of the water as well. The overall device is simultaneously to be as simple and easy to operate as possible and the residue (both metal and water) is to be reusable or at least as non-detrimental to the environment as possible.

This object is attained in accordance with the invention in that (a) the inner surfaces of the side walls of the water tank slope in below the surface that supports the material, (b) a forwarding gutter extends along the bottom of the tank and accommodates an apron-type conveyor, (c) the upper strand of the conveyor extends through the front wall of the tank and up through a water-tight duct to a container that accommodates the coarser particles, (d) a sludge trough is positioned below the gutter at the end that the bottom strand of the conveyor travels toward, (e) the device for raising and lowering the level of the water includes an inflatable cushion located in the tank and under the water.

Advantageous embodiments of the invention will be described hereinafter by way of example.

The basic principle of the invention is first to remove the cutting residue as rapidly as possible (characteristics a through d) and second to modify the device for raising and lowering the level of the water such that, although the water is still expelled by air, the air never comes directly into contact with the water, which contains the residual metal.

The particular cross-section of the tank accumulates the sediment that occurs during the cutting process in a narrow vicinity demarcated by the width of the forwarding gutter. The coarser particles drop directly onto the upper strand of the conveyor and are continuously removed. The finer particles settle on the bottom in the form of a sludge, which the lower strand of the conveyor propels into the trough at the other end of the gutter, from which it can be removed at intervals. This approach makes it possible to separate the residue into fractions that can be variously exploited. The immediate removal of the coarser particles prevents redox reactions and exothermal processes and prolongs the usefulness of the water in the tank. It also very considerably prevents the accumulation of gas bubbles under the material. The coarser particles separated from the sludge can be exploited as scrap. Separating the two fractions of residue also makes it possible to discharge the water from the tank at a pH of 9.5 and with no more than 2 ml of fine particles per liter, which will satisfy local sewage regulations.

As will be described hereinafter by way of example, the air cushion in the device for raising and lowering the level of the water can be accommodated either inside the tank itself or to particular advantage in an auxiliary tank, which the air cushion forces an appropriate volume of water out of and admits back into. Air cushions that can be employed with water table in accordance with the invention are in themselves known. They are made from a material that is resistant to the water in the tank. They have expansion-limiting webs inside that keep their top and bottom surfaces straight and parallel when the cushions are inflated. The result is a reproducible geometry and extreme compactness. The sides and top of the auxiliary tank are preferably continuous with the exception of a water access in the front wall of the main tank and can taper out conically toward the main tank. This is an especially effective approach because no otherwise unutilized water level needs to be raised above the air cushion. If the air cushion in the auxiliary tank slopes down toward the main tank, the water will be forced out of the auxiliary tank from the rear forward with a slow rolling motion as the air enters, providing a highly elegant solution to the problem of increasing and decreasing the volumes of water in the main tank.

The apron-type conveyors in the water table in accordance with the invention are also in themselves known. The particular advantage of employing them in accordance with the invention is that the opposing motions of the upper and lower strand can in addition to conveyance be exploited to separate the cutting residue into coarse particles and sludge.

The sludge that accumulates in the trough at one end of the gutter can be removed relatively often. It has been demonstrated to be especially practical to position a ball valve specifically designed for oxide sludge in the outlet from the trough. It has been shown that even sludge that has been compacted into a sticky paste can be effectively extracted through such a ball valve, which will be described in greater detail hereinafter, at an almost parietal flow. The ball valve in one particularly advantageous embodiment is capable of handling foreign matter, meaning that, if any foreign body is trapped between the ball and the seat, the electromechanical controls will open the valve and rinse it out.

Embodiments of a water table in accordance with the invention will now be described with reference to the drawings, wherein

DETAILED DESCRIPTION OF THE INVENTION

Figure 2:
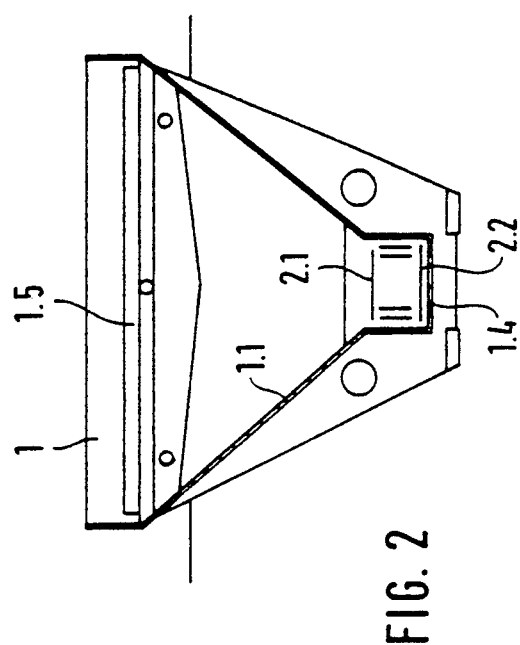
FIG. 2 is a section through the water table in FIG. 1.
Figure 1:
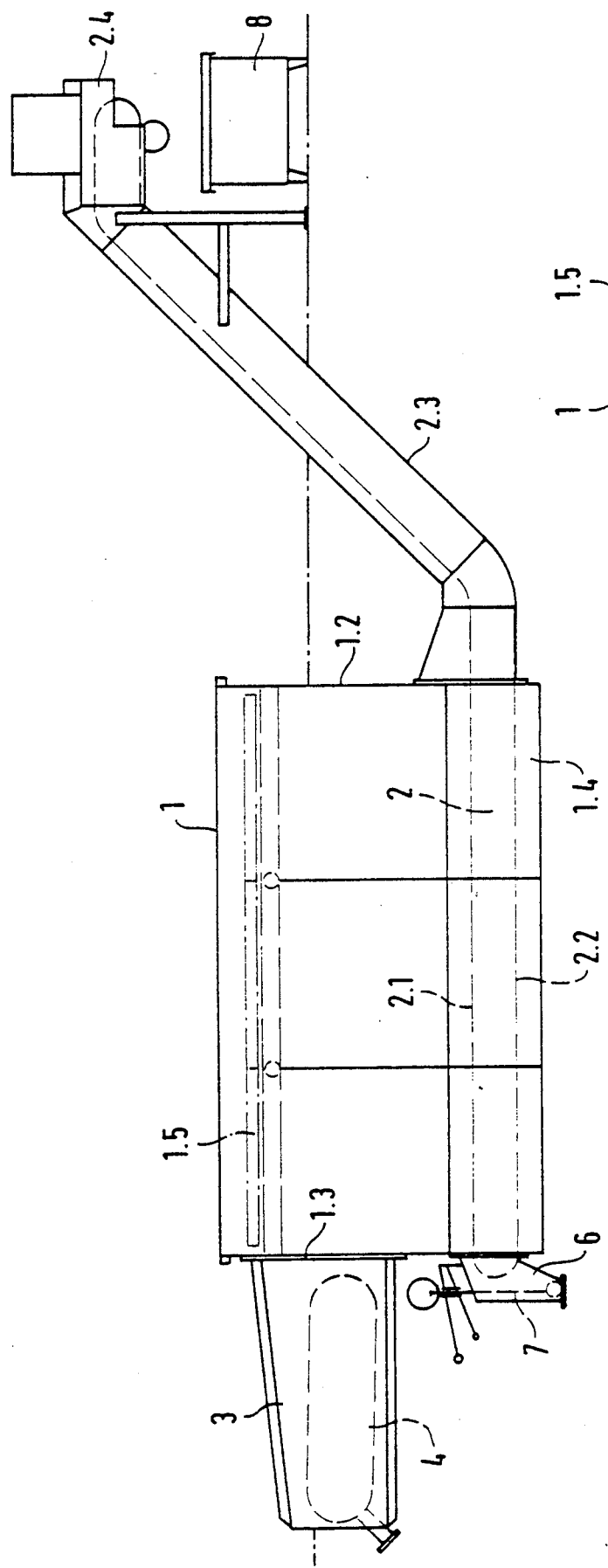
FIG. 1 is a schematic side view of a water table for an unillustrated plasma-based cutting machine.
Figure 3:
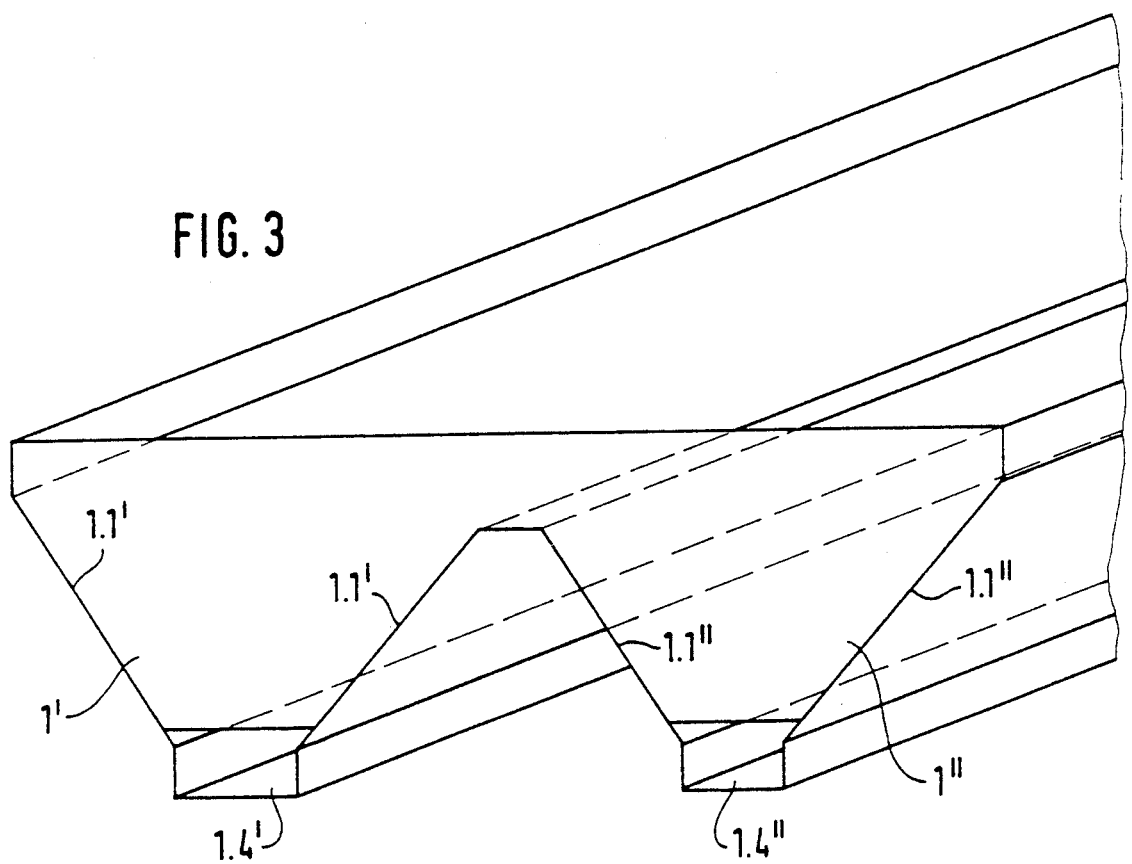
FIG. 3 is a highly simplified perspective view of part of another embodiment of a tank for a water table.

FIGS. 1 and 2 schematically illustrate the most important component of a water table that is operated in conjunction with an unillustrated plasma-based cutting machine. The system has a water tank 1 that is open at the top. Its side walls 1.1 slope down and in and its front wall 1.2 and rear wall 1.3 are more or less vertical. Side walls 1.1 slope down into a forwarding gutter 1.4 in the bottom of water tank 1. The walls of the gutter are, as will be evident from FIG. 2, vertical. The overall cross-section of the tank is essentially V-shaped. It is on the other hand also possible, as illustrated in FIG. 3, to create a double tank by positioning two tanks of the type illustrated in FIGS. 1 and 2 side by side and connecting them at the top into a tank with a W-shaped cross-section and consisting of subsidiary tanks 1' and 1", each with sides 1.1' and 1.1" that slope in and down and with a forwarding gutter 1.4' or 1.4" extending along the bottom.

The tank or tanks can be made of steel or plastic. It is, however, also possible to make them out of steel-reinforced concrete. The angles at which the sides slope in will, in accordance with the coefficients of friction of the particular materials employed, ensure that the cutting residue slides down easily and rapidly to collect in forwarding gutter 1.4 or gutters 1.4' and 1.4" at the bottom of the tank.

A material-supporting surface 1.5, which can be made from flat-rolled structural sections for example and which will not be described in greater detail herein, is positioned at the top of the tank.

Figure 4:
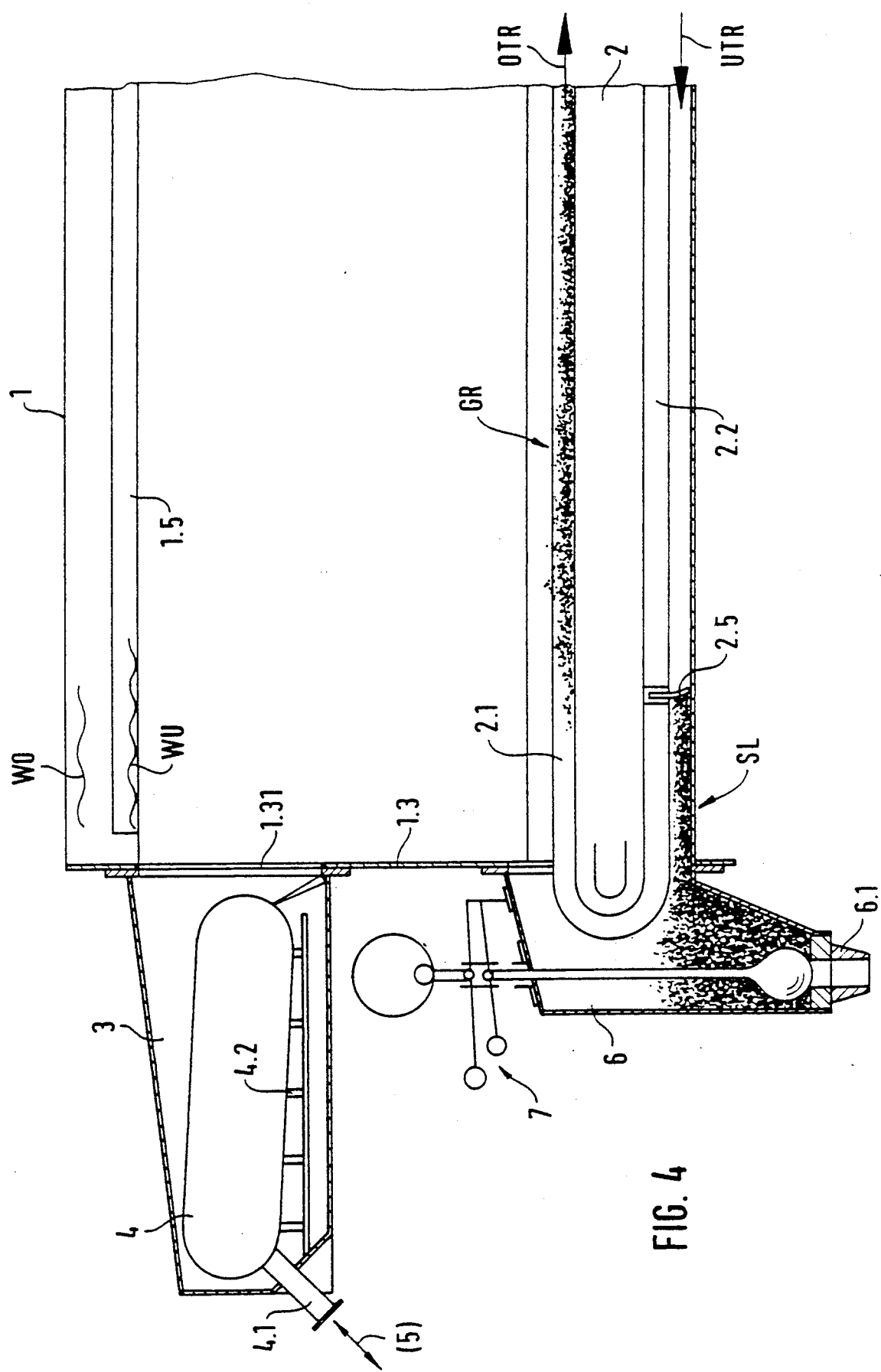
FIG. 4 is a view at a scale slightly larger than that of FIG. 1 of part of the water table illustrated in that figure.

Inside forwarding gutter 1.4 or inside each gutter 1.4' and 1.4" is an apron-type conveyor 2 with its upper strand 2.1 extending essentially over the width of the gutter directly adjacent to sloping side walls 1.1 and with its lower strand 2.2 traveling near the floor of the gutter. Conveyor 2 extends all the way along forwarding gutter 1.4 or gutters 1.4' and 1.4", out in the direction traveled by upper strand 2.1 through the front wall 1.2 of the tank, and up at an angle through a water-tight duct 2.3 to its output end 2.4, which is elevated and has a granulate container 8 below it. A deep sludge trough 6 is positioned at the end of forwarding gutter 1.4 that the lower strand 2.2 of conveyor 2 travels toward. Sludge trough 6 has, as will be explained hereinafter, an outlet 6.1 that can be blocked off by a valve 7. As will be particularly evident from FIG. 4, conveyor 2 has two important functions. First, its upper strand 2.1 intercepts any granules GR of metal that accumulate in forwarding gutter 1.4 and convey them in direction OTR and eventually into granulate container 8. Second, its lower strand 2.2 conveys the sludge SL that accumulates on the bottom of forwarding gutter 1.4 in direction UTR and eventually into sludge trough 6. This basically frictional approach to propelling the sludge can be augmented by mounting appropriate conveying components 2.5 on the apron-type conveyor. Finally, conveyor 2 not only removes the cutting residue but also separates it into two fractions.

Conveyor 2 can conveniently be provided with "over-the-weekend" controls to operate it at three-hours intervals in response to an optical warning outside of work hours or when the plant is shut down. The object is to make sure that all sections of the conveyer belt will travel through the water in the tank and be kept moist to prevent the particles of metal from cementing.

Tank 1 will contain water when the system is in operation, and the level of the water can be raised from an elevation WU below material-supporting surface 1.5 to an elevation WO above it by a device that will now be described and that is illustrated in FIGS. 4 through 7. Positioning the material being cut on a supporting surface below the level of the water is an essential component of underwater plasma-based cutting. Approximately 3 $m^3$ of water must be shifted in reasonable time in order to raise and lower the water level in relation to a material-support surface 1.5 measuring approximately 14 $m^2$. The device illustrated in FIGS. 4 through 7 is particularly appropriate in terms of power consumption and floor area. It comprises an inflatable air cushion 4 of tank-water resistant material that is constructed in a known way to ensure that, when it is inflated, its opposing large sides will be straight and parallel. The result is a cushion with a reproducible geometry that can be accommodated in a very small space. Air cushion 4 is accommodated inside an auxiliary tank 3 secured to the rear wall 1.3 of water tank 1 with its interior essentially below water elevation WU. The total surface of auxiliary tank 3, including its top, is continuous, with the exception of an access opening 1.31 that it communicates with the inside of water tank 1 through. The advantage is that, when air cushion 4 expands, no non-utilizable water level will need to be raised. To ensure elegance with respect to shifting the volumes of water involved, air cushion 4 can slope down toward water tank 1 at an angle that ensures that the water will be forced in in a slow rolling motion from behind. This sloping suspension will occur automatically due to the difference in length of the buoyancy-control loops in cushion holder 4.2 while the water is being forced in.

Figure 5:
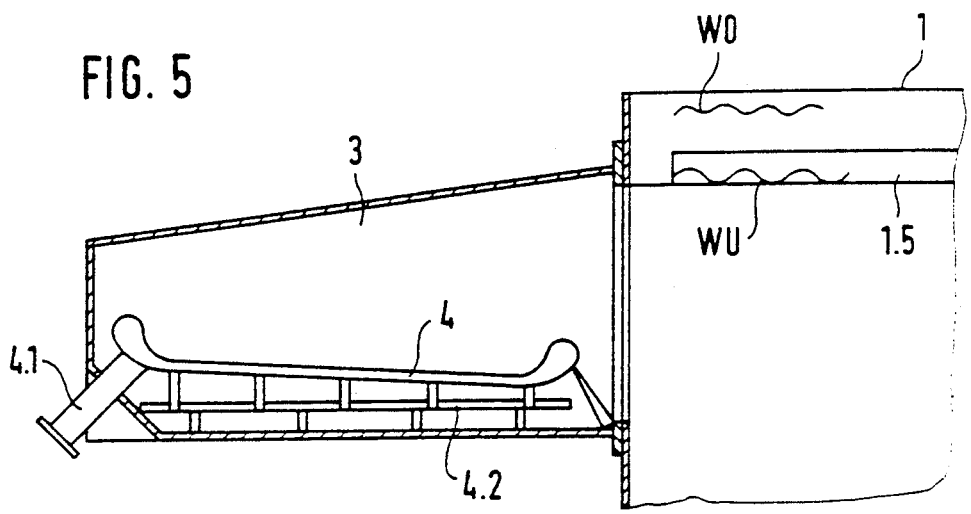
FIGS. 5 through 7 are details of FIG. 4 illustrating the auxiliary tank in the water table illustrated in FIGS. 1 and 4 with the air cushion at different states.
Figure 6:
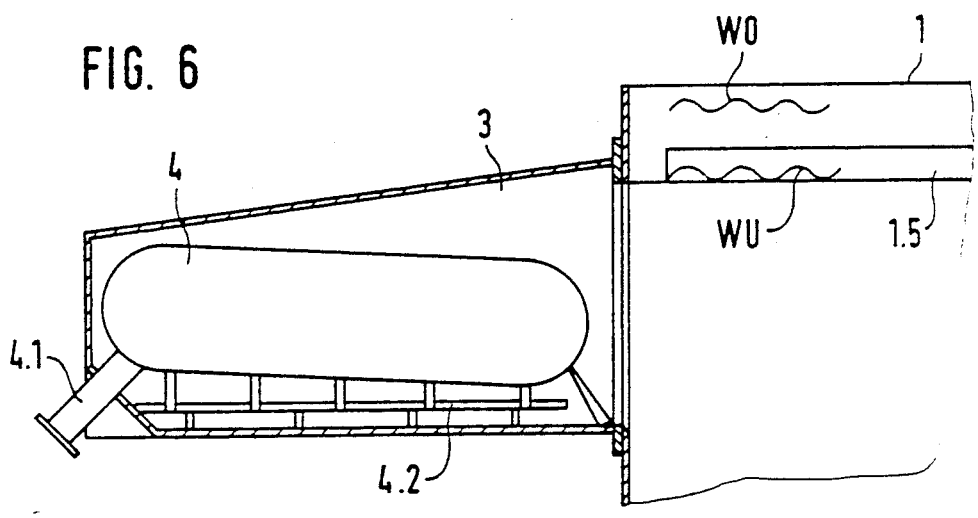
Figure 7:
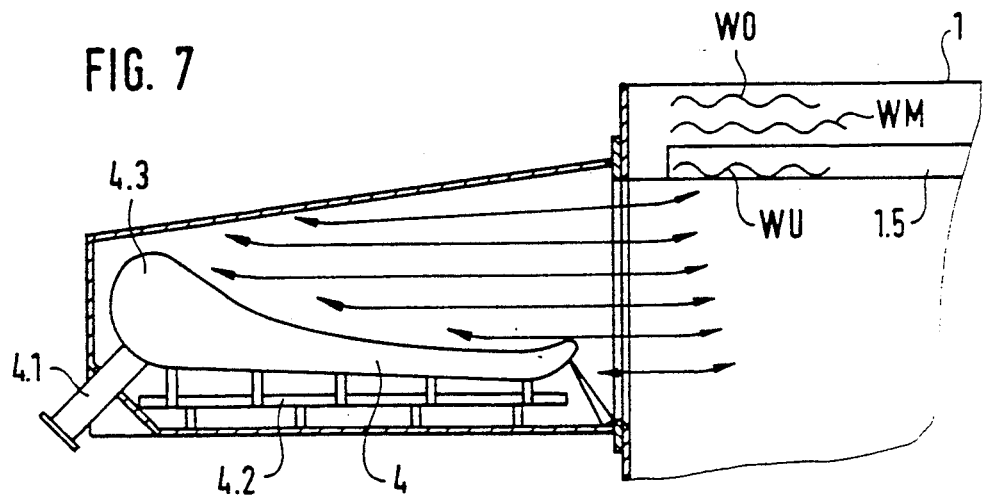

The procedures themselves are illustrated in FIGS. 5 through 7.

FIG. 5 illustrates the disengaged situation, with air cushion 4 collapsed and the water down to elevation WU. Air flows in through a supply line 4.1, raising the level of the water to highest elevation WO as illustrated in FIG. 6. FIG. 7 represents an intermediate state, with the cushion only partly inflated and the water level raised only to an intermediate elevation WM. In this situation the special design and position of air cushion 4 accumulates the air at its rear 4.3 in particular.

Another advantage of accommodating air cushion 4 in auxiliary tank 3 is that it is protected from the coarse cutting residue that settles through the water or slides down the sides of the tank.

Figure 8:
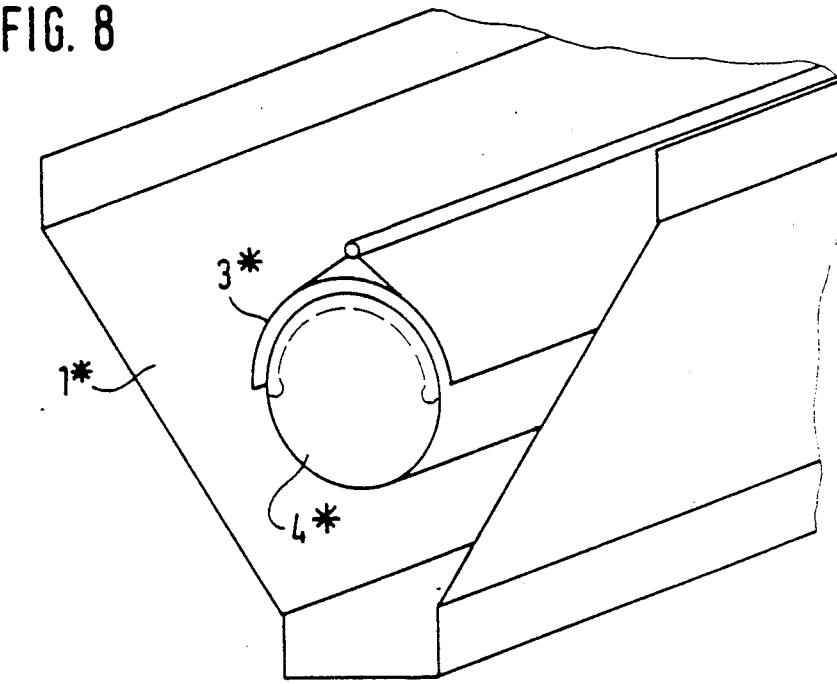
FIG. 8 is a perspective representation of part of an embodiment of a water table with a different type of air cushion.

It is of course also possible to position the air cushion differently. FIG. 8 illustrates one possibility, which is especially sensible when the utilizable cutting surfaces have to be very large. The embodiment illustrated in FIG. 8 involves an elongated air cushion 4* extending along the inside of a water tank 1*. The top of the cushion is protected from the precipitating particles of metal by a hood 3*.

Figure 9:
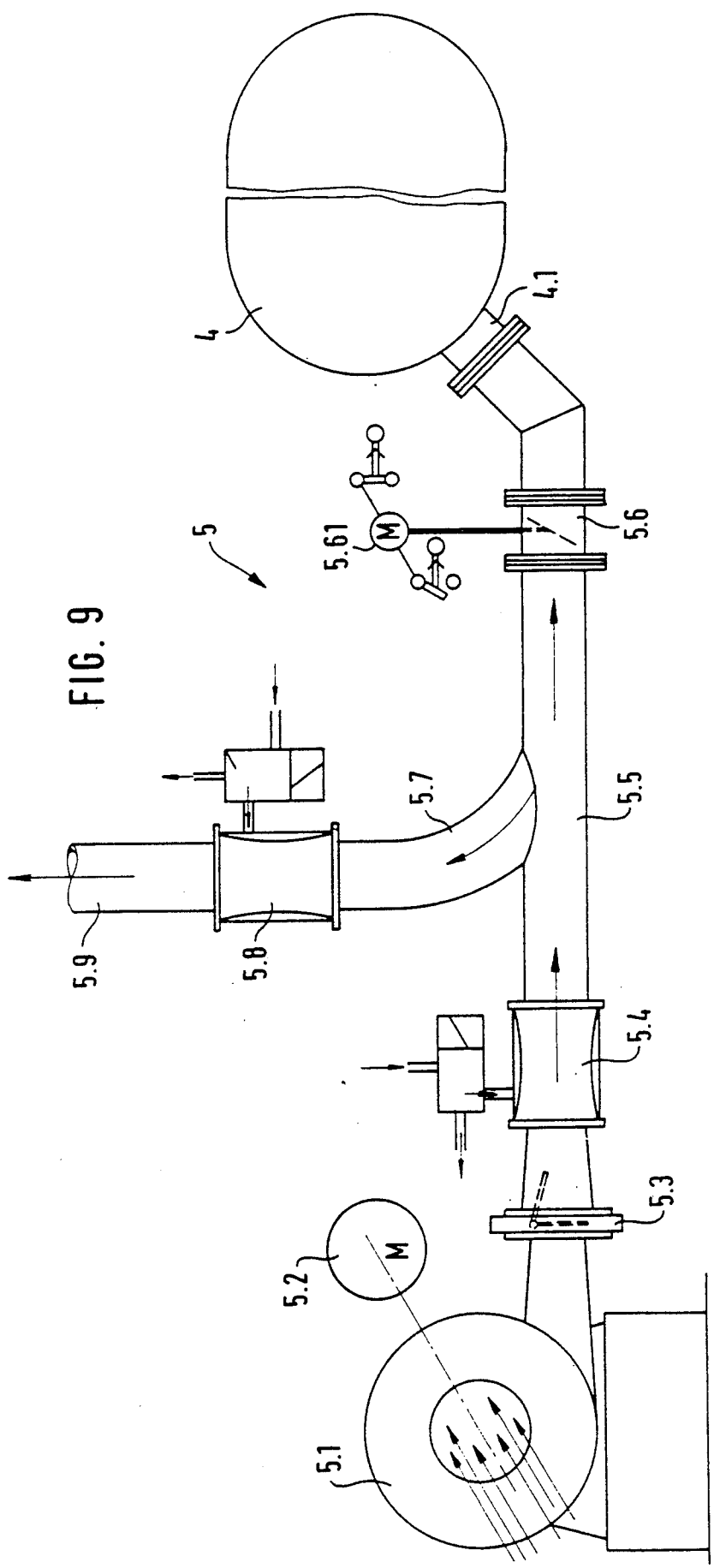
FIG. 9 is a schematic side view of a device for supplying air to the water table illustrated in FIGS. 5 through 7.

Air is supplied to air cushion 4 by the device illustrated in detail in FIG. 9.

Because a high volume of low-compression air is needed in a short time and for reasons of safety, the air for inflating air cushion 4 is not obtained from a conventional source but through a specially designed compressor.

Air compressor 5.1 contains a radial fan operated by a motor 5.2, and its outlet communicates with the line 4.1 that supplies cushion 4 with air by way of a check valve 5.3 that keeps water out, of a commercially available servo-controlled elastic-wall valve 5.4, and of a choke 5.6 that can be adjusted by way of a motor 5.61. A branch 5.7 opens into the section 5.5 of line between elastic-wall valve 5.4 and communicates with an air outlet 5.9 by way of another servo-controlled elastic-wall valve 5.8.

The advantage of elastic-wall valves 5.4 and 5.8 is that they open without current while promoting flow and resist corrosion. The motor-controlled choke 5.6 makes it possible to prescribe the flow rate to prevent thin-walled work from floating up out of their proper position when the level of the water is raised. The raising and lowering of the water level is controlled manually with a compass-rose switch on the system's unillustrated control panel. The operator can also switch to automatic operation. The timing can be electronically set such that pressing the RAISE button will activate the compressor automatically to obtain a water elevation appropriate for sheet of a particular thickness. The circuitry associated with the elastic-wall valves can be designed to ensure that, when the level of the water is raised beyond part-way (FIG. 7), the fan will not as it comes into action produce any detrimental pressure intervention (destabilization of the water level).

The sludge accumulating in sludge trough 6 must be instantaneously emptied from time to time. This is accomplished with a timed outlet valve 7, which is illustrated in detail in FIGS. 10 and 11.

Figure 10:
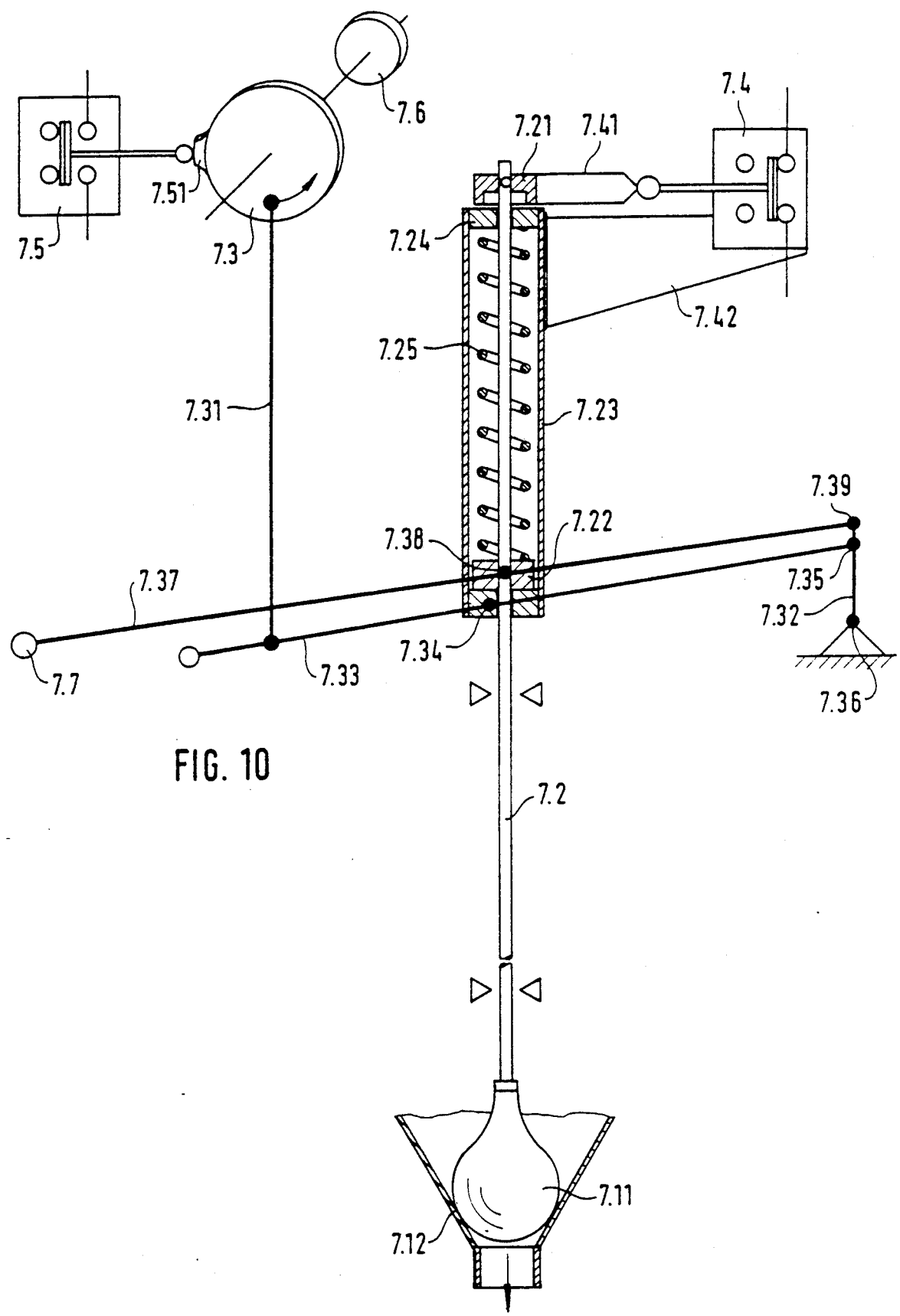
FIG. 10 is a highly schematic representation illustrating the principle behind the outlet into the sludge trough associated with the water table illustrated in FIGS. 1 and 4, with the valve closed.
Figure 11:
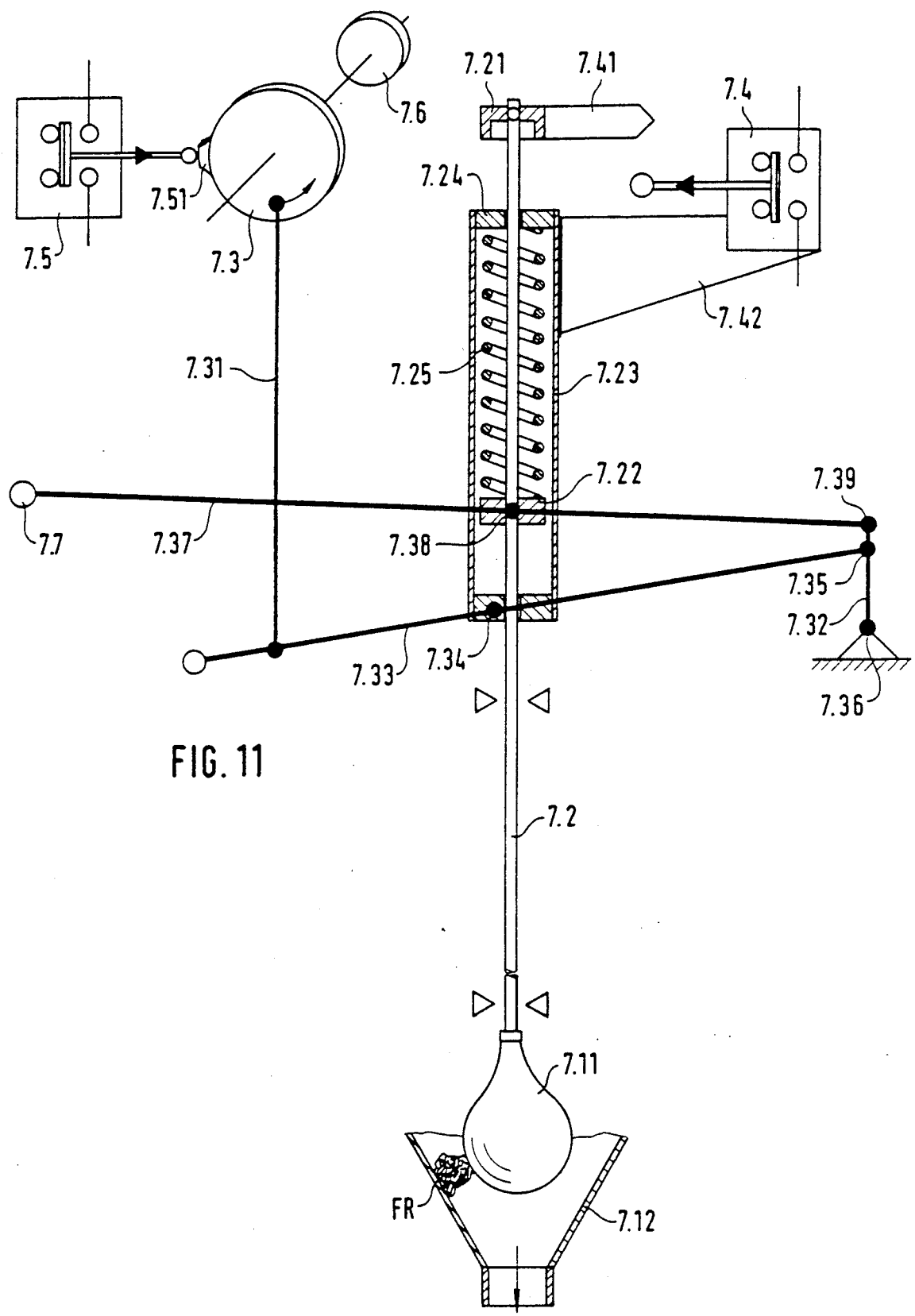
FIG. 11 is an illustration similar to that in FIG. 10 but with the valve clogged.

A ball valve that is particularly appropriate for oxide sludges has been developed to ensure reliable sludge removal. Its ball 7.11 rests against a seat 7.12 in outlet 6.1 and communicates by way of a rod 7.2 with a motorized crank mechanism, opening and closing the valve at the prescribed intervals. Rod 7.2 extends coaxially for this purpose through a sliding cylindrical sleeve 7.23 that has a stop 7.24 at the top. The top of the rod rests on a counteracting stop 7.21 that is integrated into it on stop 7.24. The bottom of sleeve 7.23 is connected at an articulation 7.34 to a pair of linkages that consists of two members 7.33 and 7.32 with pivots 7.35 and 7.36 and is articulated to a crank mechanism 7.3 by way of a thrust rod 7.31, which is operated by a motor 7.6. Rod 7.2 can be raised through sleeve 7.23 against the force of a helical spring 7.25, lifting ball 7.11. One end of spring 7.25 rests against stop 7.24, which is secured to sleeve 7.23, and the other against a stop 7.22, which is secured to rod 7.2. The rod is secured at an articulation 7.38 to another pair of linkages that consists of links 7.37 and 7.32 and of links 7.39 and 7.36. A lever 7.7 is secured to link 7.37. Also associated with rod 7.2 is a limit switch 7.4 that is rigidly secured to sleeve 7.23 by a holder 7.42. Limit switch 7.4 is activated by a lifter 7.41 mounted on the top of rod 7.2. Another limit switch 7.5 is positioned in crank mechanism 7.3 and is activated by a lifter 7.51 mounted thereon. How this valve operates will be immediately evident from FIG. 10. The motor 7.8 that operates crank mechanism 7.3 is engaged and disengaged at intervals by electronic controls that will not be described in detail herein. The valve illustrated in FIG. 10 is closed. Activating crank mechanism 7.3 lifts rod 7.2 through sleeve 7.23 by way of stop 7.21 and hence raises ball 7.11. Crank mechanism 7.3 rotates all the way around to close the valve again. The limiting position of the crank mechanism is sensed by limit switch 7.5. The stroke can be adjusted at crank mechanism 7.3 to vary the volume of air let out. The valve can also be opened manually by lever 7.7. As will be evident from FIG. 11, the valve will also respond directly to any foreign body FR jammed between ball 7.11 and seat 7.12. Rod 7.2 will be displaced toward sleeve 7.23 and the force of spring 7.25. Lifter 7.41 will activate limit switch 7.4, initiating an activation cycle on the part of crank mechanism 7.3 by way of unillustrated electric controls. The effectiveness of the outlet procedure can be verified through an unillustrated window.

The sludge diverted from sludge trough 6 by way of valve 7 can be forwarded to a sludge compactor by way of a diaphragm pump.

What is claimed is:

1. In a water table for a thermal-cutting machine, having a surface for supporting material, means forming a main tank receiving the table to immerse the surface and means for raising and lowering the level of the water in the tank, the improvement wherein the means forming the main tank comprises a bottom, a front wall, side walls with inner surfaces sloping in below the surface that supports the material, a forwarding gutter extending along the bottom of the main tank and accommodating an apron-type conveyor having an upper strand extending through the front wall of the main tank and up through a water-tight duct to a container for accommodating coarser particles and a sludge trough positioned below the gutter at an end that a bottom strand of the conveyor travels toward, and wherein the means for raising and lowering the level of the water comprises an inflatable cushion in the main tank and under the water.

2. The water table as in claim 1, wherein the air cushion extends through the inside of the main tank below a hood.

3. The water table as in claim 1, further comprising an auxiliary tank secured to one end wall of the main tank with its interior essentially below the water level and communicating with the inside of the main tank and accommodating the air cushion therein.

4. The water table as in claim 3, wherein the auxiliary tank has a continuous surface except for an access opening in an end wall of the main tank tapering out conically toward the main tank.

5. The water table as in claim 4, wherein the air cushion in the auxiliary tank slopes down toward the main tank.

6. The water table as in claim 1, further comprising means for supplying air to the cushion comprising a compressor that communicates with the air cushion through a section including a check valve, a variable elastic-wall valve, and a variable choke, and wherein a branch that communicates with an air outlet by way of another variable elastic-wall valve is positioned between the first elastic-wall valve and the choke.

7. The water table as in claim 1, wherein the forwarding gutter accommodates the conveyor with the upper strand of the conveyor essentially as wide as the gutter and directly below the bottom edge of the downward-sloping side walls and the lower strand directly against the bottom of the gutter.

8. The water table as in claim 1, further comprising an outlet at a lowest point in the sludge trough and connected to a sludge-removal line and accommodating a timer-controlled ball valve.

9. The water table as in claim 8, wherein the ball in the valve is connected to a motorized crank mechanism by a rod to time cycles for opening and closing the valve.

10. The water table as in claim 9, wherein the rod extends coaxially through a cylindrical sliding sleeve, one end of which is engaged by the crank mechanism and the other end of which rests against a stop secured to a free end of the rod, and which travels back and forth through the sleeve against the force of a helical spring inside the sleeve to open the valve, and a limit switch for producing an electronic opening signal while the rod is being displaced in relation to the sleeve and a control circuit that initiates a valve opening-and-closing cycle by the motorized crank mechanism in response to the opening signal.

11. The water table as in claim 10, wherein the rod is directly connected to a manually operated lever for opening the valve in an emergency.

12. The water table as in claim 1, wherein the main tank is a multiple tank comprised of several individual tanks positioned side by side, each tank having side walls that slope down and in, a forwarding gutter that accommodates an apron-type conveyor, a sludge trough, and the means for raising and lowering the level of the water.

* * * * *